United States Patent
Mondo et al.

(10) Patent No.: US 9,992,358 B2
(45) Date of Patent: Jun. 5, 2018

(54) PULL PRINT SYSTEM

(71) Applicant: KYOCERA Document Solutions Inc., Osaka (JP)

(72) Inventors: Ryosuke Mondo, Osaka (JP); Koji Kubono, Osaka (JP); Masafumi Sato, Osaka (JP); Toyoaki Oku, Osaka (JP); Zhenyu Sun, Osaka (JP); Yoshio Inoue, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days. days.

(21) Appl. No.: 15/453,266

(22) Filed: Mar. 8, 2017

(65) Prior Publication Data
US 2017/0279974 A1 Sep. 28, 2017

(30) Foreign Application Priority Data

Mar. 25, 2016 (JP) .................. 2016-061299
Mar. 25, 2016 (JP) .................. 2016-061308

(51) Int. Cl.
*G06F 15/00* (2006.01)
*H04N 1/00* (2006.01)
*G06F 3/12* (2006.01)

(52) U.S. Cl.
CPC ......... *H04N 1/0023* (2013.01); *G06F 3/1253* (2013.01); *H04N 1/00244* (2013.01); *H04N 1/00411* (2013.01); *H04N 2201/0094* (2013.01)

(58) Field of Classification Search
CPC ....... H04N 2201/0094; H04N 1/00411; H04N 1/0023; H04N 1/00244; G06F 3/1253
USPC ................................ 358/1.13–1.15
See application file for complete search history.

(56) References Cited

U.S. PATENT DOCUMENTS

| | | | |
|---|---|---|---|
| 9,298,483 B2 | 3/2016 | Shirasaka | |
| 2012/0162681 A1* | 6/2012 | Tomita | G06F 3/1222 358/1.13 |
| 2014/0115608 A1 | 4/2014 | Shirasaka | |
| 2015/0178031 A1* | 6/2015 | Kanamori | G06F 3/1288 358/1.15 |

FOREIGN PATENT DOCUMENTS

| | | |
|---|---|---|
| JP | 2008-217097 A | 9/2008 |
| JP | 2014-085749 A | 5/2014 |

* cited by examiner

*Primary Examiner* — Saeid Ebrahimi Dehkord
(74) *Attorney, Agent, or Firm* — IP Business Solutions, LLC (57) ABSTRACT

A pull print system includes a printing apparatus (MFP) that executes a print job, a pull print server that spools the print job to be executed as a pull print by the printing apparatus, and an electronic device that sends the print job to the pull print server. The pull print server sends to the electronic device setting information for a job setting being a setting of the print job, and when displaying a setting screen for the job setting, the electronic device displays the setting screen on which the setting information sent from the pull print server is reflected.

7 Claims, 11 Drawing Sheets

PULL PRINT SYSTEM

INCORPORATION BY REFERENCE

This application claims priority to Japanese Patent Application No. 2016-061299 filed on 25 Mar. 2016, and Japanese Patent Application No. 2016-061308 filed on 25 Mar. 2016, the entire contents of which are incorporated by reference herein.

BACKGROUND

This disclosure relates to a pull print system.

A typical print system is known which includes: a printing apparatus that executes a print job; and an electronic device that sends the print job to the printing apparatus. In installing a printer driver on the electronic device in this print system, the electronic device requests the printing apparatus to send a setting of a printer driver (hereinafter, referred to as a "driver setting"). When requested from the electronic device to send the driver setting, the printing apparatus notifies the electronic device of the driver setting. Then, the electronic device installs the printer driver thereon in keeping with the driver setting notified by the printing apparatus. For example, the electronic device installs thereon a plug-in for the printer driver from an external storage device.

SUMMARY

According to an aspect of the present disclosure, a pull print system includes:
a printing apparatus that executes a print job;
a pull print server that spools the print job to be executed as a pull print by the printing apparatus; and
an electronic device that sends the print job to the pull print server.

The pull print server sends to the electronic device setting information for a job setting being a setting of the print job. When displaying a setting screen for the job setting, the electronic device displays the setting screen on which the setting information sent from the pull print server is reflected.

DETAILED DESCRIPTION

Hereinafter, a description will be given of one embodiment of this disclosure with reference to the drawings.

First, a description will be given of a configuration of a pull print system according to this embodiment.

Figure 1:
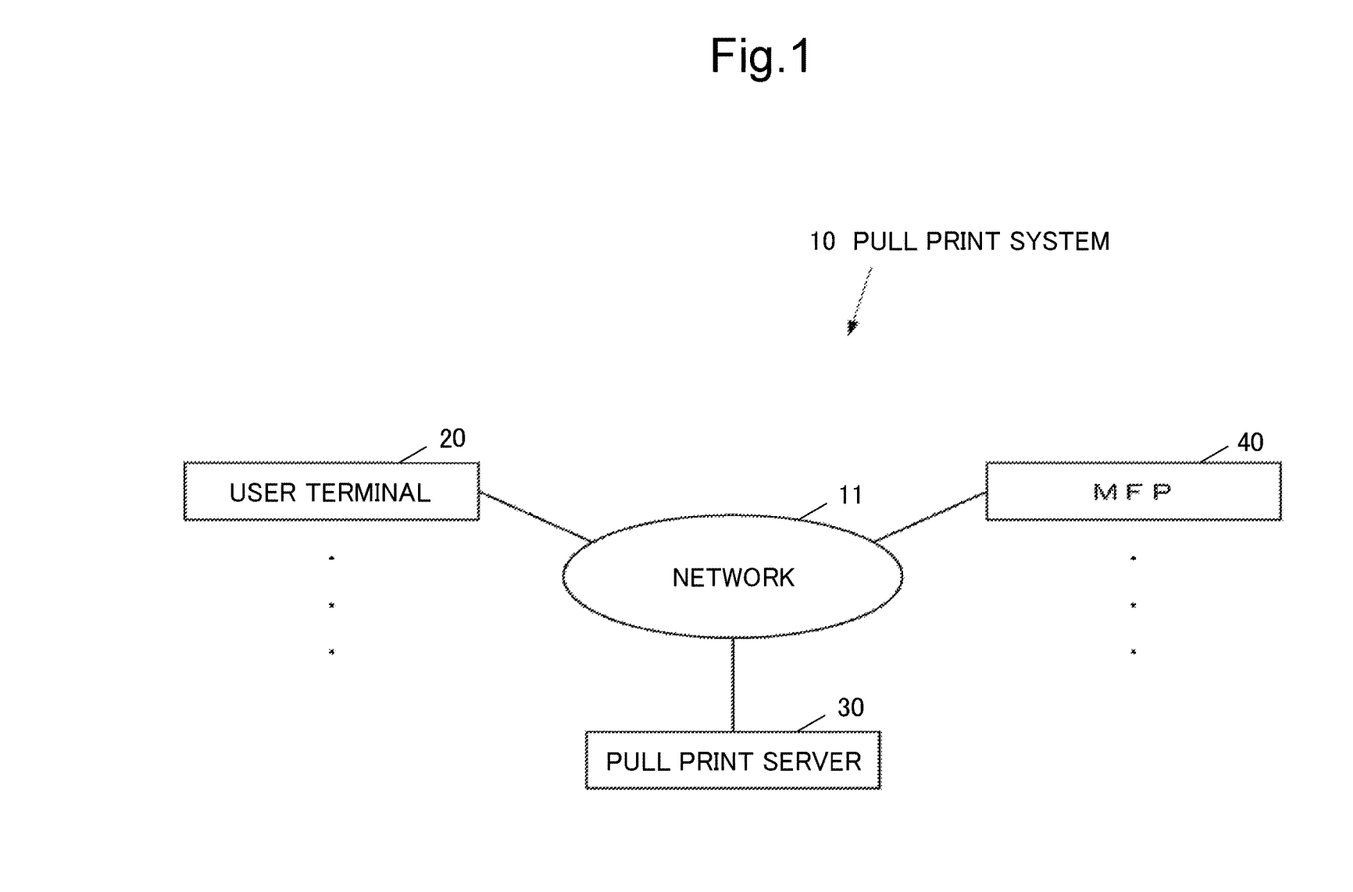
FIG. 1 is a schematic diagram illustrating a configuration of a pull print system according to one embodiment of this disclosure.

FIG. 1 is a schematic diagram illustrating a configuration of a pull print system 10 according to this embodiment.

As illustrated in FIG. 1, the pull print system 10 includes: a user terminal 20 serving as an electronic device that generates a print job; a pull print server 30 that spools the print job generated by the user terminal 20; and an MFP (Multifunction Peripheral) 40 serving as a printing apparatus that executes the print job. The user terminal 20, the pull print server 30, and the MFP 40 can communicate with each other via a network 11, such as a LAN (Local Area Network) or the Internet.

The pull print system 10 may include a plurality of user terminals similar to the user terminal 20. However, the following description will be given of the user terminal 20 as a representative of user terminals included in the pull print system 10.

Likewise, the pull print system 10 may include a plurality of MFPs similar to the MFP 40. However, the following description will be given of the MFP 40 as a representative of MFPs included in the pull print system 10.

The pull print server 30 has: a spooling function to spool a print job generated by a user terminal 20 included in the pull print system 10; an authentication function to specify a user or group capable of using the pull print server 30; and an inhibition function to inhibit the spooling of a print job having a specific print setting. In order to use the spooling function of the pull print server 30, the user terminal 20 only has to include a general printer driver. However, in order to use the authentication function and inhibition function of the pull print server 30, the user terminal 20 needs to include not only a general printer driver but also a plug-in dedicated for the printer driver.

Figure 2:
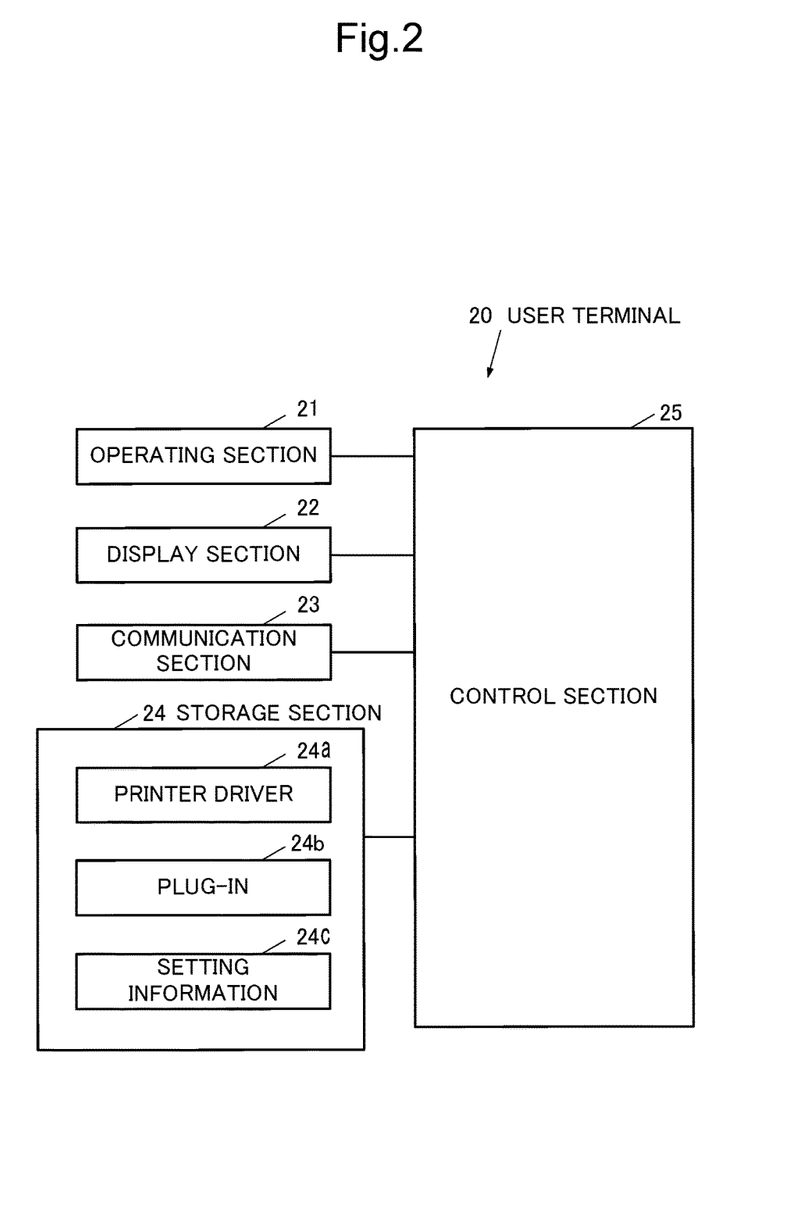
FIG. 2 is a schematic diagram of a block configuration of a user terminal in FIG. 1.

FIG. 2 is a schematic diagram of a block configuration of the user terminal 20.

As illustrated in FIG. 2, the user terminal 20 includes: an operating section 21 serving as an input device in which various user's operations are input; a display section 22 serving as a display device, such as an LCD (Liquid Crystal Display), that displays various information; a communication section 23 serving as a communication device that communicates with external devices via the network 11 (see FIG. 1); a storage section 24 serving as a storage device storing various data, such as a semiconductor memory or an HDD (Hard Disk Drive); and a control section 25 that controls the entire user terminal 20. The user terminal 20 is constituted by a computer, such as a PC (Personal Computer).

The storage section 24 stores a printer driver 24a and a plug-in 24b for the printer driver 24a. The printer driver 24a and the plug-in 24b may be each installed on the user terminal 20 in a stage of production of the user terminal 20, additionally installed on the user terminal 20 from an external storage medium, such as a USB (Universal Serial Bus) memory, or additionally installed on the user terminal 20 via the network 11.

The plug-in 24b is necessary for using the above-described authentication function and inhibition function of the pull print server 30.

The storage section 24 is capable of storing setting information 24c for a job setting which is a setting of a print job.

The control section 25 includes, for example, a CPU (Central Processing Unit), a ROM (Read Only Memory) storing a program and various data, and a RAM (Random Access Memory) for use as a work area of the CPU. The CPU executes the program stored in the ROM or the storage section 24.

Figure 3:
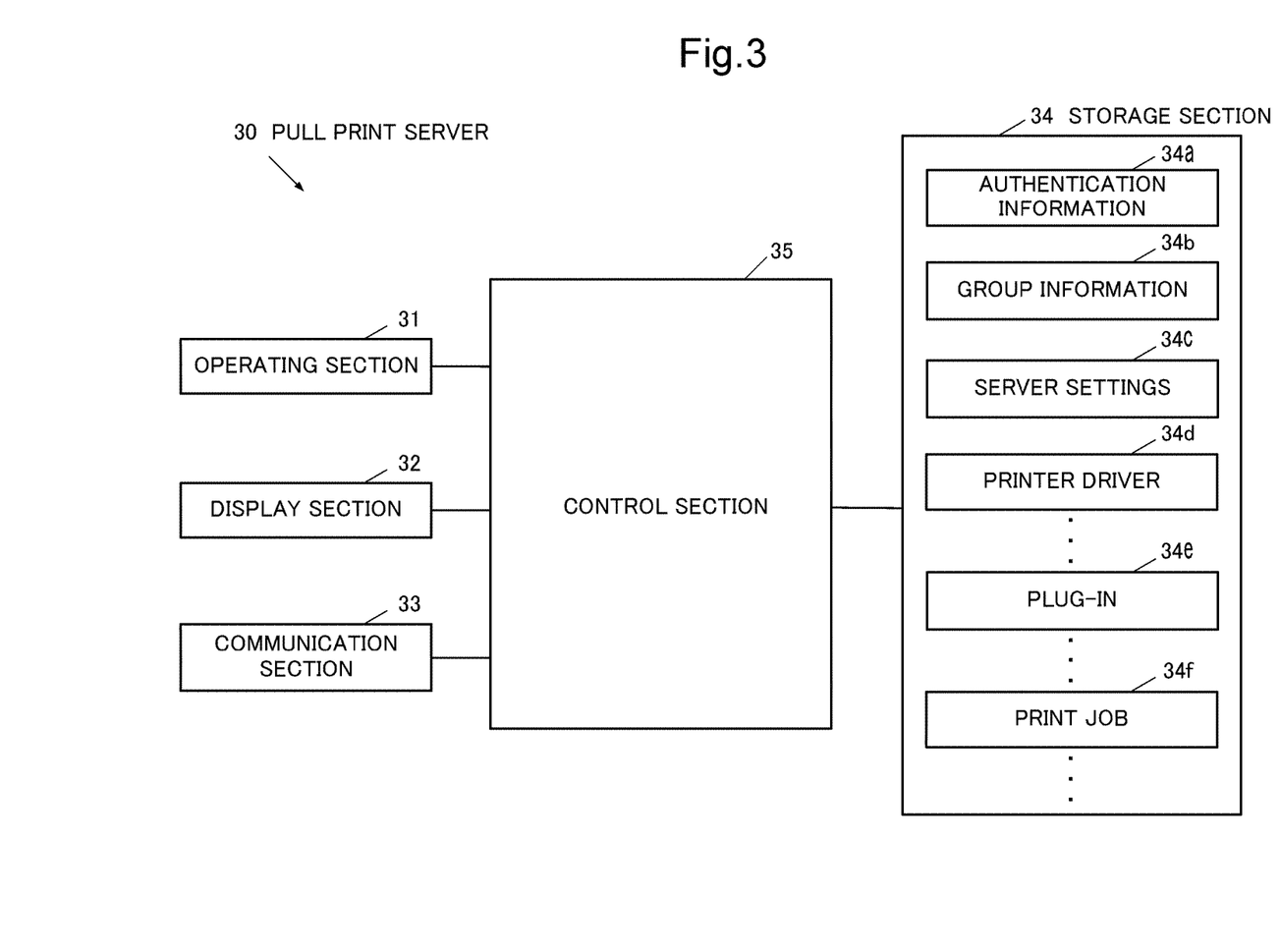
FIG. 3 is a schematic diagram of a block configuration of a pull print server in FIG. 1.

FIG. 3 is a schematic diagram of a block configuration of the pull print server 30.

As illustrated in FIG. 3, the pull print server 30 includes: an operating section 31 serving as an input device, such as a mouse or a keyboard, in which various user's operations are input; a display section 32 serving as a display device, such as an LCD, that displays various information; a communication section 33 serving as a communication device that communicates with external devices via the network 11 (see FIG. 1); a storage section 34 serving as a storage device storing various data, such as a semiconductor memory or an HDD; and a control section 35 that controls the entire pull print server 30. The pull print server 30 is constituted by a computer, such as a PC.

The storage section 34 stores authentication information 34a, such as user's identification information and/or a user's password, that can be used by the authentication function to authenticate the user.

The storage section 34 stores group information 34b indicating a group to which the user belongs. The group information 34b is used by the authentication function to specify the group to which the user belongs.

The storage section 34 stores server settings 34c which are settings of the pull print server 30. The server settings 34c include: a queue setting as a setting of a queue according to which print jobs are to be accepted; and a print setting in which the spooling of a print job is inhibited by the inhibition function (hereinafter, referred to as an "inhibition print setting"). The inhibition print setting may be set user by user or group by group.

The storage section 34 can store a plurality of printer drivers 34d and respective plug-ins 34a for the plurality of printer drivers 34d.

The storage section 34 can store a plurality of print jobs 34f.

The control section 35 includes, for example, a CPU, a ROM storing a program and various data, and a RAM for use as a work area of the CPU. The CPU executes the program stored in the ROM or the storage section 34.

Figure 4:
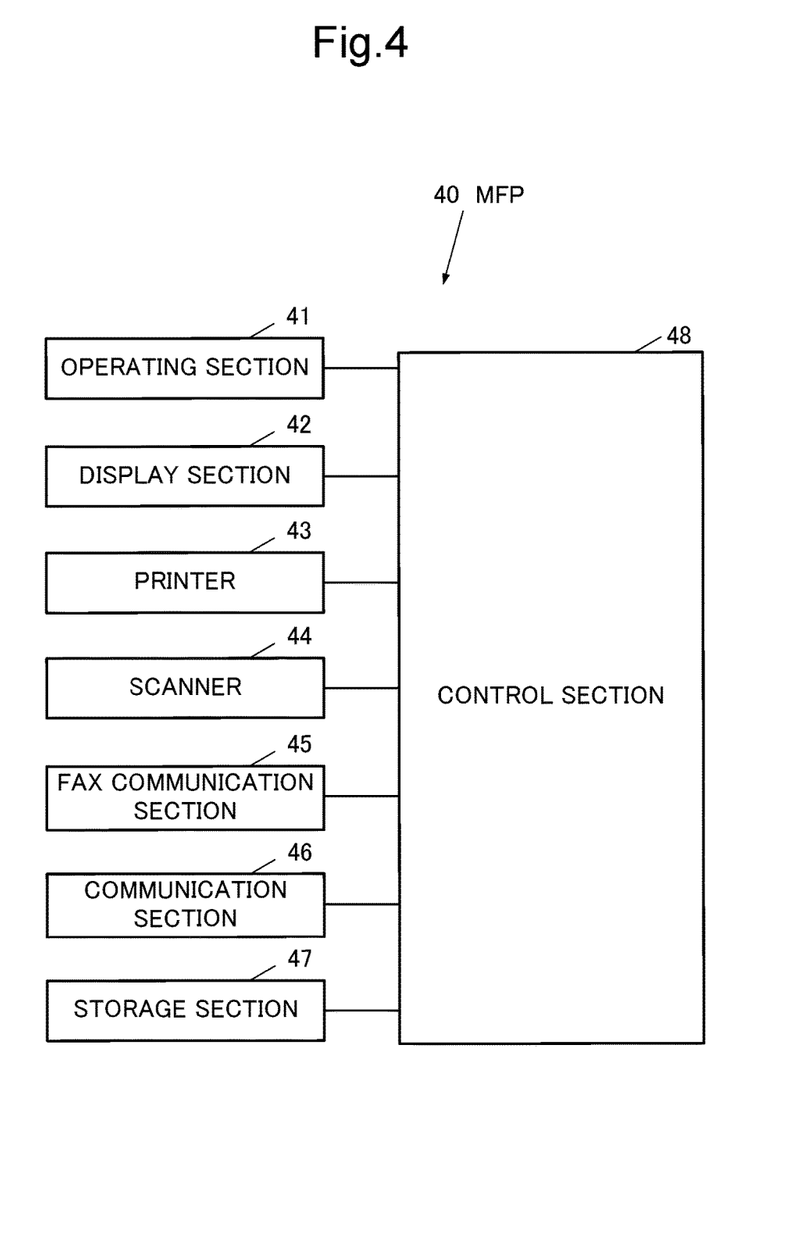
FIG. 4 is a schematic diagram of a block configuration of an MFP in FIG. 1.

FIG. 4 is a schematic diagram of a block configuration of the MFP 40.

As illustrated in FIG. 4, the MFP 40 includes: an operating section 41 serving as an input device, such as buttons, in which various user's operations are input; a display section 42 serving as a display device, such as an LCD, that displays various information; a printer 43 serving as a printing device that performs printing on a recording medium, such as a paper sheet; a scanner 44 serving as a scanning device that scans image data from an original document; a fax communication section 45 serving as a facsimile device that performs facsimile communication with unshown external facsimile devices via communication lines, such as a public phone line; a communication section 46 serving as a network communication device that communicates with external devices via the network 11 (see FIG. 1); a storage section 47 serving as a storage device storing various data, such as a semiconductor memory or an HDD; and a control section 48 that controls the entire MFP 40.

The control section 48 includes, for example, a CPU, a ROM storing a program and various data, and a RAM for use as a work area of the CPU. The CPU executes the program stored in the ROM or the storage section 47.

Next, a description will be given of various operation performed by the pull print system 10.

First, the following description refers to operation performed by the pull print system 10 in installing a printer driver and a plug-in on a user terminal.

Figure 5:
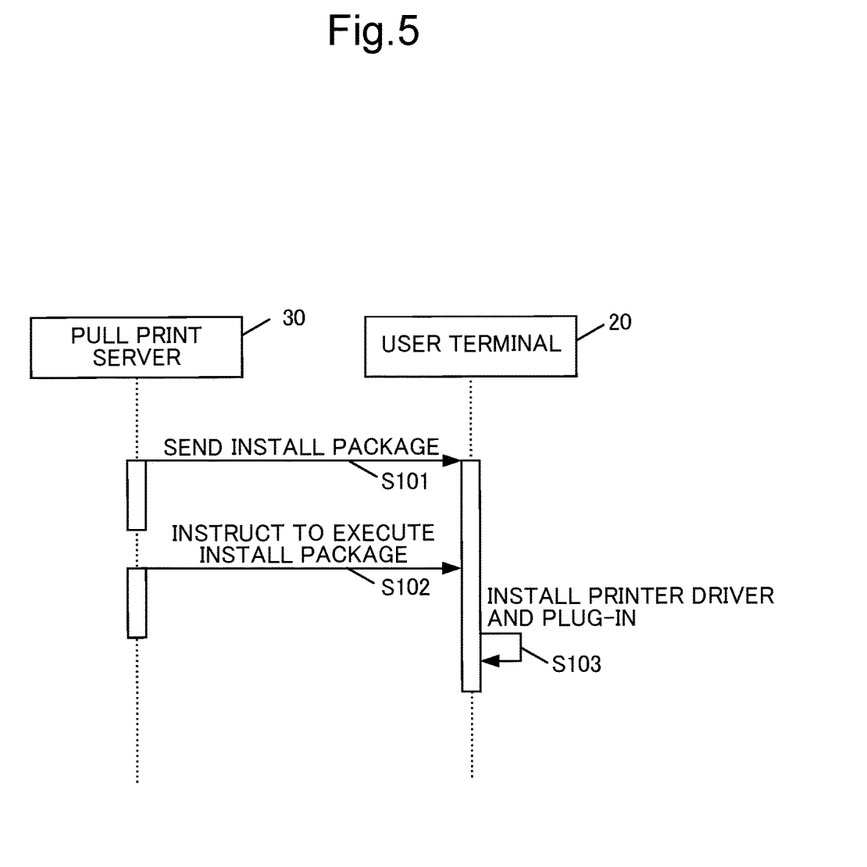
FIG. 5 is a sequence diagram of operation performed by the pull print system in FIG. 1 in installing a printer driver and a plug-in on the user terminal.

FIG. 5 is a sequence diagram of the operation performed by the pull print system 10 in installing a printer driver and a plug-in on the user terminal.

The control section 35 of the pull print server 30 previously generates a self-extracting install package containing: a target printer driver 34d; a target plug-in 34e; and an automated installer for use in installing the target printer driver 34d and plug-in 34e. Then, the control section 35 periodically confirms whether or not there is any user terminal on which the printer driver and plug-in contained in the target install package are to be installed and, in the presence of a user terminal on which they are to be installed, performs the operation in FIG. 5. FIG. 5 is a diagram when the user terminal on which the printer driver and plug-in contained in the target install package are to be installed is the user terminal 20.

As illustrated in FIG. 5, the control section 35 of the pull print server 30 sends the target install package to the user terminal 20 (S101) and instructs the user terminal 20 to execute the install package sent in S101 (S102).

In response to this, the control section 25 of the user terminal 20 unpacks the install package sent from the pull print server 30 in S101 and runs the automated installer, thereby installing the target printer driver and plug-in (S103).

Next, the following description refers to operation performed by the pull print system 10 in updating the plug-in on the user terminal.

Figure 6:
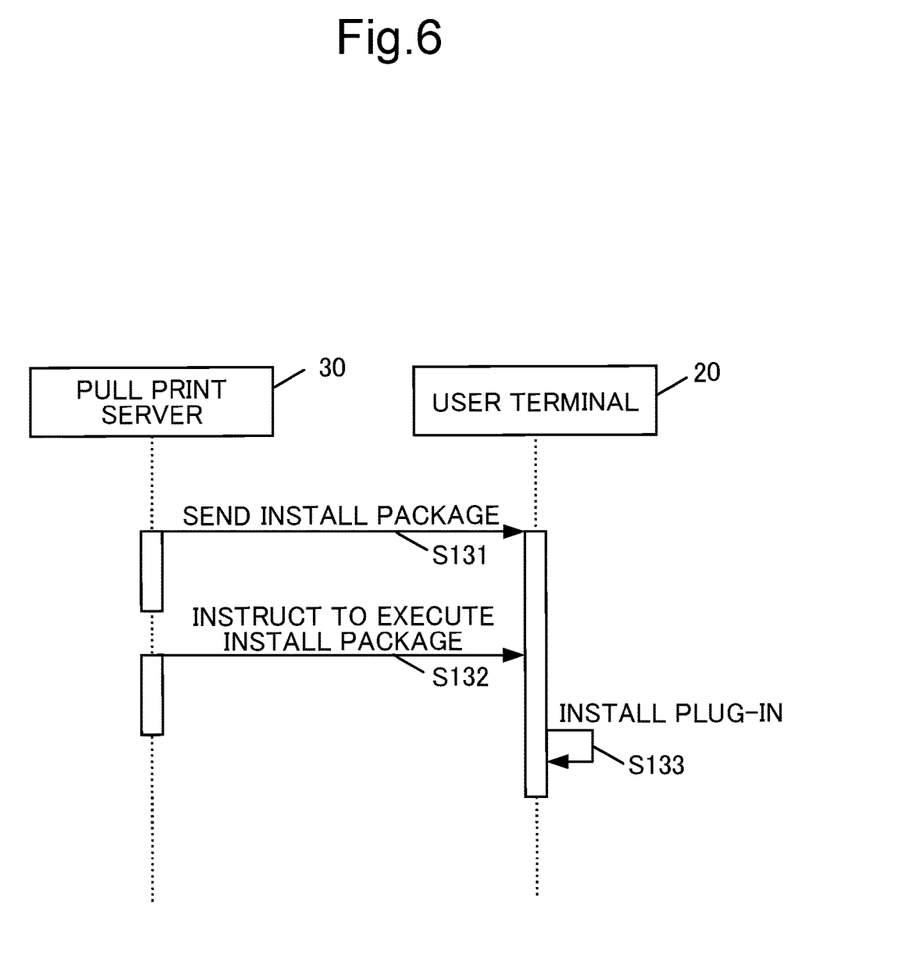
FIG. 6 is a sequence diagram of operation performed by the pull print system in FIG. 1 in updating the plug-in on the user terminal.

FIG. 6 is a sequence diagram of the operation performed by the pull print system 10 in updating the plug-in on the user terminal.

The control section 35 of the pull print server 30 previously generates a self-extracting install package containing: a plug-in 34e to be updated; and an automated installer for use in installing the plug-in 34e. Then, the control section 35 periodically confirms whether or not the plug-in contained in the target install package should be installed and performs, if the plug-in should be installed, the operation in FIG. 6. FIG. 6 is a diagram when the user terminal on which the plug-in contained in the target install package should be installed is the user terminal 20.

As illustrated in FIG. 6, the control section 35 of the pull print server 30 sends the target install package to the user terminal 20 (S131) and instructs the user terminal 20 to execute the install package sent in S131 (S132). Although in FIG. 6 the control section 35 executes processes in S131 and S132 on the user terminal 20, it in fact executes the processes in S131 and S132 on all user terminals managed by the pull print server 30.

In response to the above instruction, the control section 25 of the user terminal 20 unpacks the install package sent from the pull print server 30 in S131 and runs the automated installer, thereby installing the target plug-in (S133).

Next, the following description refers to operation performed by the pull print system 10 in changing the setting information 24c on the user terminal 20.

Hereinafter, the operation described as operation of the printer driver 24a is operation of the control section 25 executing the printer driver 24a. Likewise, the operation described as operation of the plug-in 24b is operation of the control section 25 executing the plug-in 24b.

Figure 7:
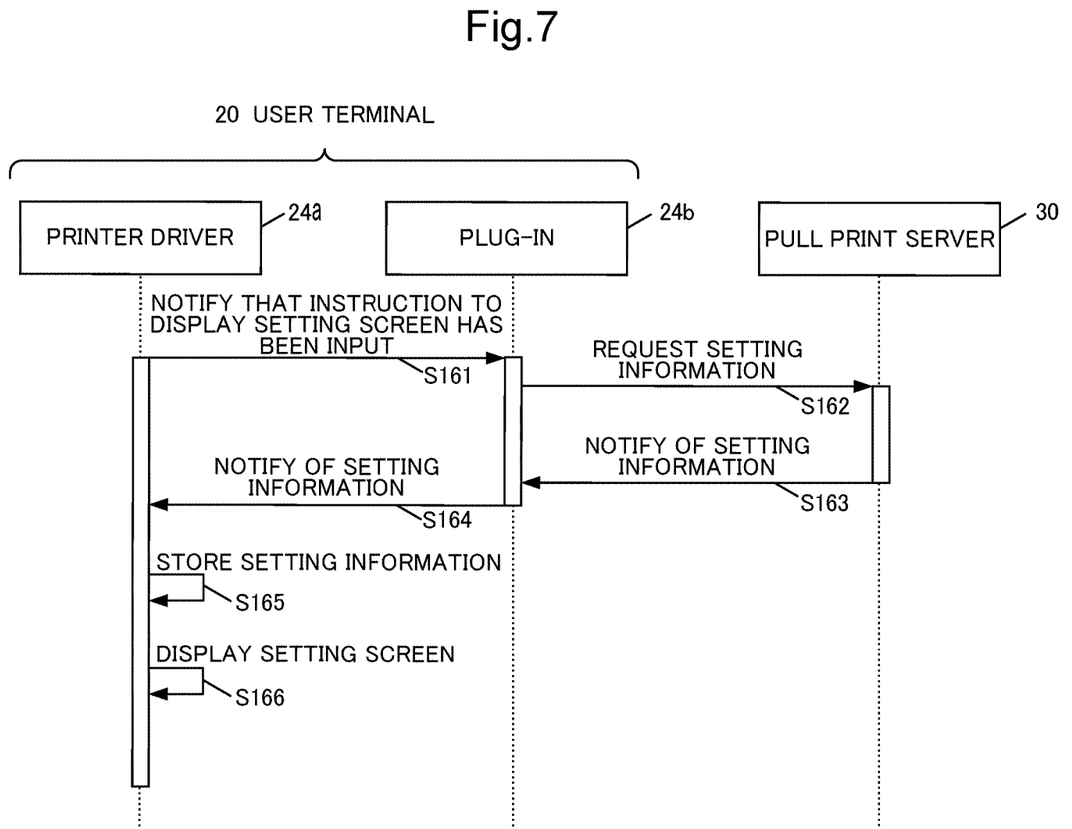
FIG. 7 is a sequence diagram of operation performed by the pull print system in FIG. 1 in changing setting information on the user terminal.

FIG. 7 is a sequence diagram of the operation performed by the pull print system 10 in changing the setting information 24c on the user terminal 20.

As illustrated in FIG. 7, when an instruction to display a setting screen for a job setting is input to the user terminal 20 via the operating section, the printer driver 24a on the user terminal 20 notifies the plug-in 24b that the instruction has been input (S161).

Upon notification in S161, the plug-in 24b requests the pull print server 30 to send setting information (S162).

Upon receipt of the request in S162, the control section 35 of the pull print server 30 notifies the user terminal 20 of the setting information (S163). This setting information is preferably one generated depending on the user currently operating the user terminal 20 or the group to which the user belongs. The control section 35 can specify the user currently operating the user terminal 20 by previously authenticating the user based on the authentication information 34a by the authentication function. Furthermore, the control section 35 can specify, based on the group information 34b, the group to which the user currently operating the user terminal 20 belongs.

The plug-in 24b on the user terminal 20 notifies the printer driver 24a of the setting information notified by the pull print server 30 in S163 (S164).

Thus, the printer driver 24a stores as setting information 24c the setting information notified by the plug-in 24b in S164 (S165) and causes a setting screen based on the setting information 24c to be displayed (S166).

Figure 8A:
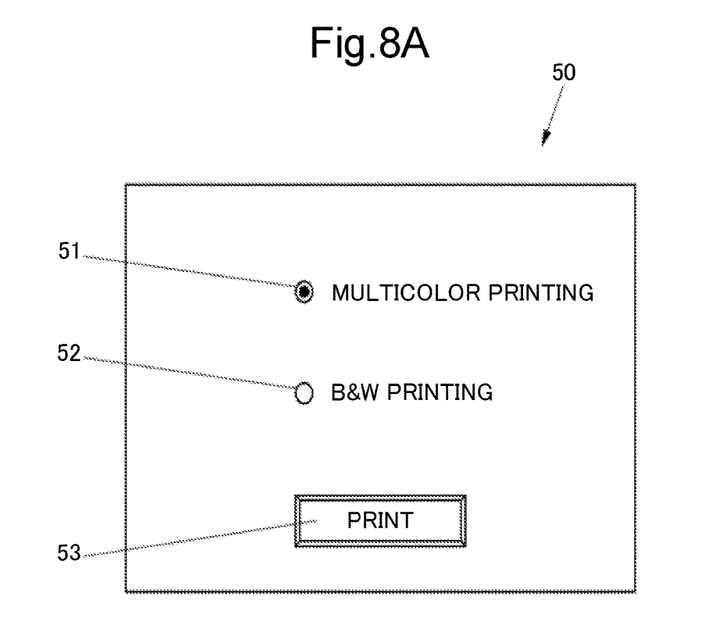
FIG. 8A is a schematic diagram illustrating one example of a setting screen before the setting information notified by the pull print server in FIG. 7 is reflected thereon.
Figure 8B:
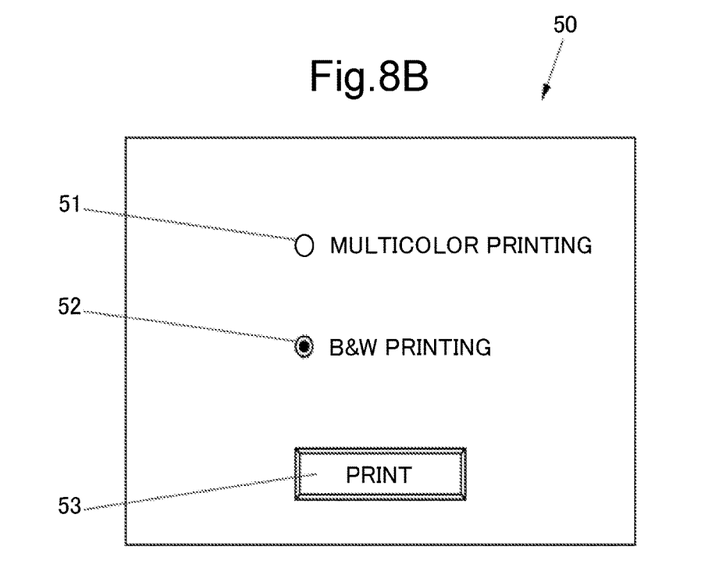
FIG. 8B is a schematic diagram illustrating one example of the setting screen after the setting information notified by the pull print server in FIG. 7 is reflected thereon.

FIG. 8A is a schematic diagram illustrating one example of a setting screen 50 before the setting information notified by the pull print server 30 is reflected thereon. FIG. 8B is a schematic diagram illustrating one example of the setting screen 50 after the setting information notified by the pull print server 30 is reflected thereon.

The setting screen 50 in FIG. 8A includes a radio button 51 for selecting multicolor printing, a radio button 52 for selecting black-and-white printing, a print button 53 for instructing execution of printing.

Like the setting screen 50 in FIG. 8A, the setting screen 50 in FIG. 8B also includes the radio button 51, the radio button 52, and the print button 53. However, the setting screen 50 in FIG. 8B is different from the setting screen 50 in FIG. 8A in that the radio button 51 is grayed out to disable the selection thereof. In other words, the setting screen 50 in FIG. 8B reflects an inhibition print setting in which multicolor printing is inhibited.

Next, the following description refers to operation performed by the pull print system 10 in sending a print job from the user terminal 20 to the pull print server 30.

Figure 9:
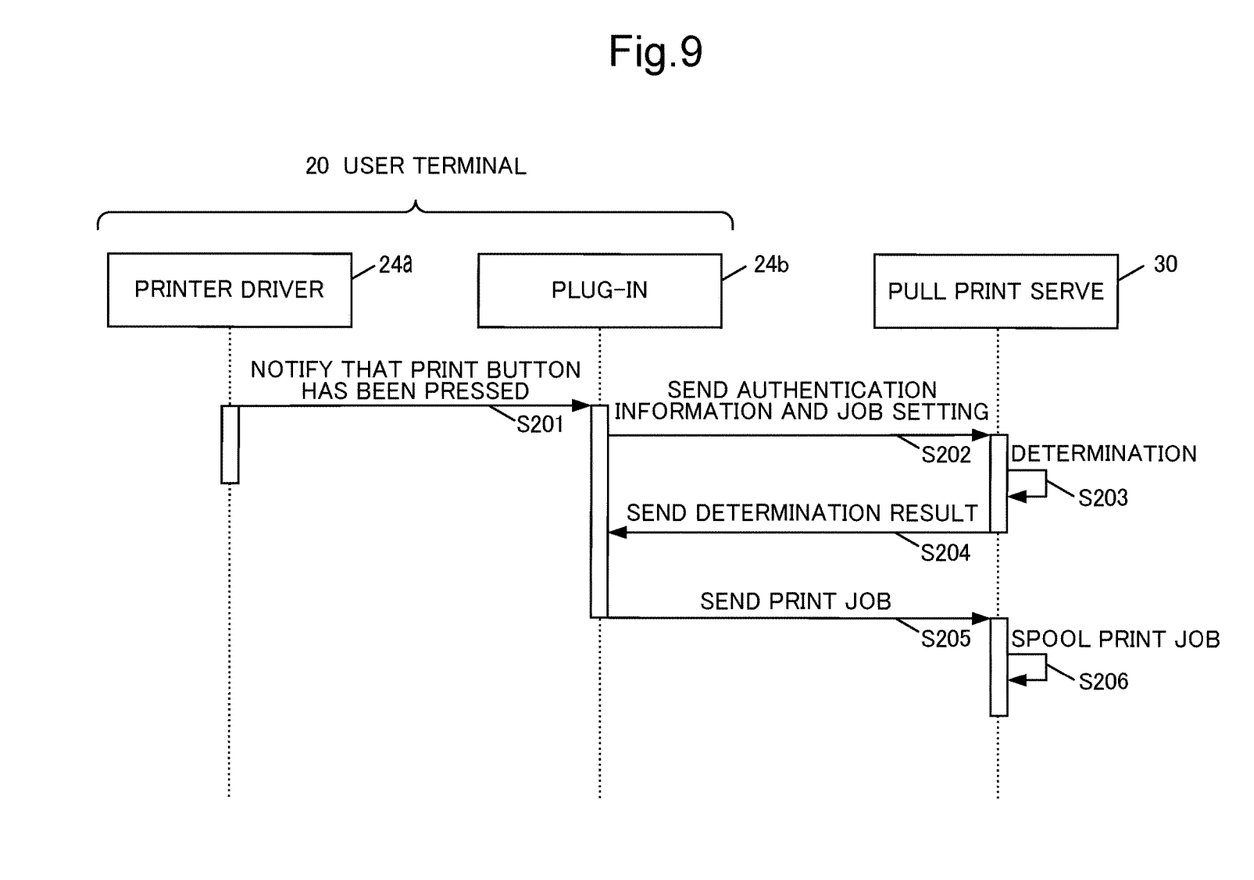
FIG. 9 is a sequence diagram of operation performed by the pull print system in FIG. 1 in sending a print job from the user terminal to the pull print server.

FIG. 9 is a sequence diagram of operation performed by the pull print system 10 in sending a print job from the user terminal 20 to the pull print server 30.

As illustrated in FIG. 9, when the print button 53 is pressed on the setting screen 50, the printer driver 24a on the user terminal 20 notifies the plug-in 24b that the print button 53 has been pressed (S201).

In response to this, the plug-in 24b sends to the pull print server 30 authentication information on the user currently operating the user terminal 20 and a job setting of a print job intended to be sent, such as a setting of multicolor printing or black-and-white printing (S202).

The control section 35 of the pull print server 30 determines, based on the information sent from the user terminal 20, whether to spool the target print job or not by the authentication function and the inhibition function (S203) and sends the determination result to the user terminal 20 (S204).

When the determination result indicating that the target print job is to be spooled is sent from the pull print server 30 in S204 and received by the plug-in 24b on the user terminal 20, the plug-in 24b sends the print job to the pull print server 30 (S205).

The control section 35 of the pull print server 30 spools, by its spooling function, the print job sent in S205 as a print job 34f of the user currently operating the user terminal 20 (S206).

Figure 10:
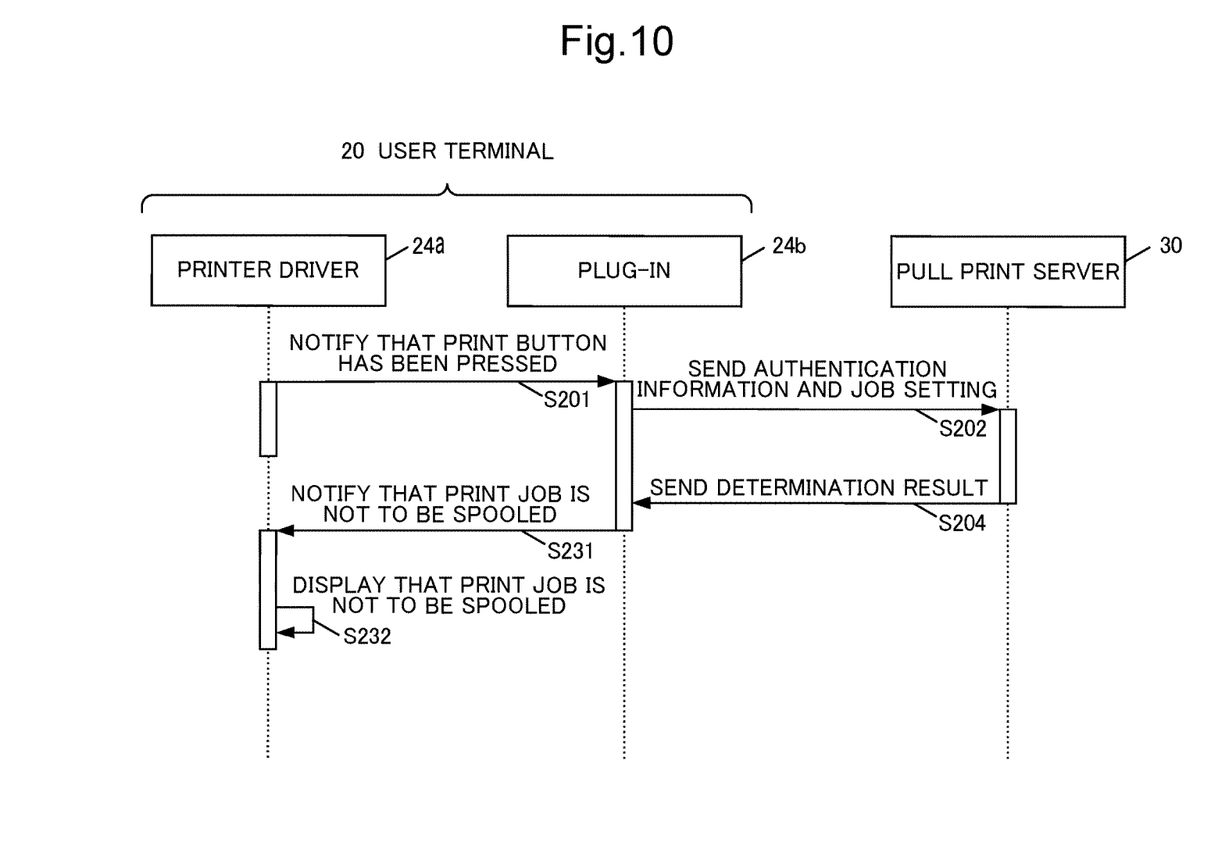
FIG. 10 is a sequence diagram of operation performed by the pull print system in FIG. 1 when the pull print server determines not to spool a target print job because a setting screen reflecting the setting information notified by the pull print server has not been displayed.

FIG. 10 is a sequence diagram of operation performed by the pull print system 10 when the pull print server 30 determines not to spool the target print job because the setting screen 50 reflecting the setting information notified by the pull print server 30 has not been displayed.

As illustrated in FIG. 10, the processes in S201 to S204 are the same as those in FIG. 9. However, in FIG. 10, the determination result indicating that the target print job is not to be spooled is sent from the pull print server 30 in S204 and, therefore, the plug-in 24b on the user terminal 20 notifies the printer driver 24a that the target print job is not to be spooled (S231).

In response to this, the printer driver 24a causes the display section 22 to display a message indicating that the target print job is not to be spooled by the pull print server 30 (S232).

Next, the following description refers to operation performed by the pull print system 10 in performing a pull print.

Figure 11:
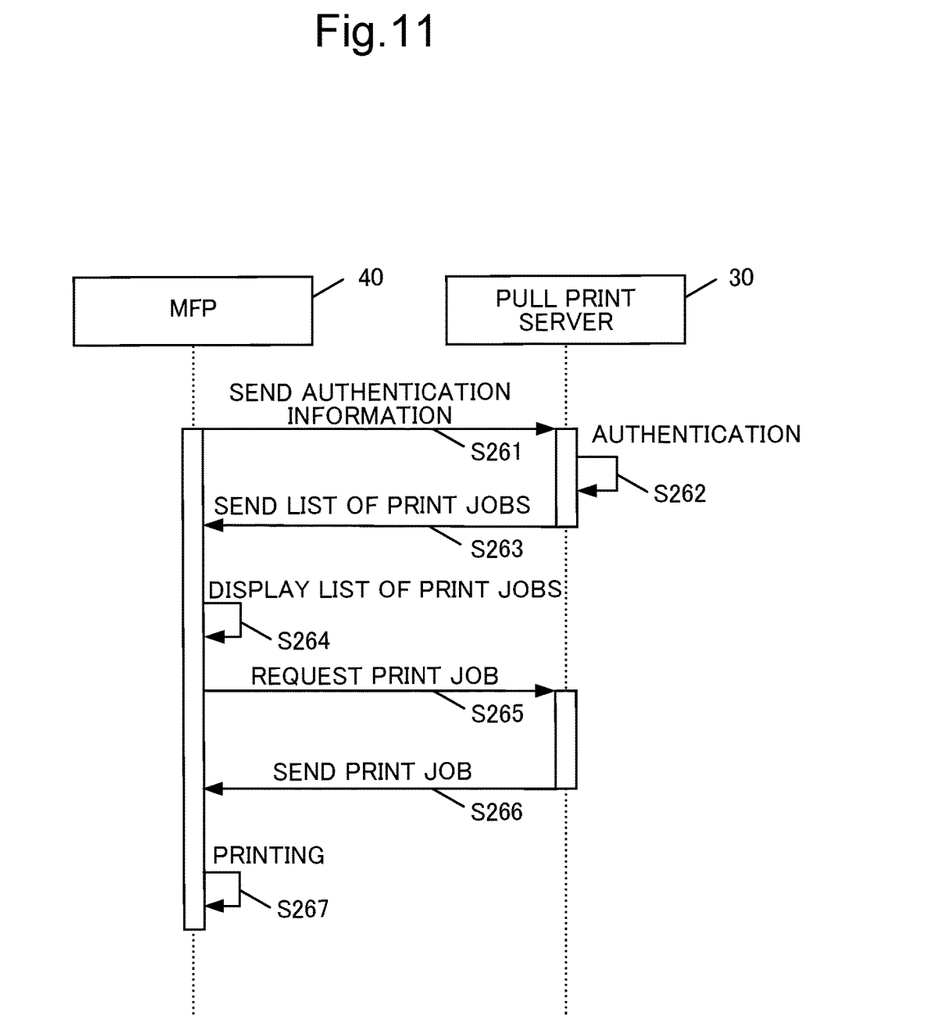
FIG. 11 is a sequence diagram of operation performed by the pull print system in FIG. 1 in performing a pull print.

FIG. 11 is a sequence diagram of the operation performed by the pull print system 10 in performing a pull print.

As illustrated in FIG. 11, when authentication information on the user is input to the MFP 40 via the operating section 41, the control section 48 of the MFP 40 sends the input authentication information to the pull print server 30 (S261).

Next, the control section 35 of the pull print server 30 specifies the user by authenticating the user by the authentication function based on the authentication information sent in S261 (S262) and sends, out of print jobs 34f being spooled by the spooling function, a list of print jobs 34f of the user specified in S262 to the MFP 40 (S263).

Next, the control section 48 of the MFP 40 causes the display section 42 to display the list sent in S263 (S264) and requests the pull print server 30 to send, out of the print jobs displayed in S264, a print job selected via the operating section 41 (S265).

The control section 35 of the pull print server 30 sends the print job 34f requested in S265 to the MFP 40 (S266).

The control section 48 of the MFP 40 causes the printer 43 to execute the print job sent in S266 (S267).

The foregoing description with reference to FIGS. 9 and 11 has been given of a pull print. However, the control section 25 of the user terminal 20 may cause the printer driver 24a to directly send a print job to the MFP 40, in which case also the control section 48 of the MFP 40 can cause the printer 43 to execute the print job.

The pull print system 10 according to the one embodiment of this disclosure causes the pull print server 30 to notify the user terminal 20 of setting information for a job setting which is a setting of a print job (S163) and causes the user terminal 20 to display a setting screen for the job setting on which the setting information given from the pull print server 30 to the user terminal 20 is reflected (S166). Therefore, a suitable print job can be sent from the user terminal 20 to the pull print server 30 via the setting screen on which the setting information suitable for the pull print server 30 is reflected.

The pull print system 10 according to the one embodiment of this disclosure causes the user terminal 20 to request the pull print server 30 to send setting information (S162) in order to display a setting screen 50 for a job setting on the user terminal 20 (S166). Therefore, as compared to the configuration in which all user terminals managed by the pull print server 30 are concurrently notified of setting information, temporal increase in load on the pull print server 30 and the network 11 due to notification of the setting information from the pull print server 30 to the user terminals can be reduced.

However, the pull print system 10 may concurrently notify all the user terminals managed by the pull print server 30 of setting information. The timings with which all the user terminals managed by the pull print server 30 are notified of setting information may be periodical timings or any timings specified by an administrator.

The pull print system 10 according to the one embodiment of this disclosure displays the setting screen 50 (see FIG. 8B) where the selection of a print setting in which the pull print server 30 inhibits the spooling of a print job, i.e., the selection of an inhibition print setting, is disabled. Therefore, it can be prevented that a print job having a print setting in which the pull print server 30 inhibits the spooling is needlessly sent from the user terminal 20 to the pull print server 30.

Furthermore, since the pull print system 10 displays the setting screen 50 (see FIG. 8B) where the selection of an inhibition print setting is disabled, it can be prevented that a print job having a print setting in which the pull print server 30 inhibits the spooling is needlessly sent from the user terminal 20 to the pull print server 30, even if the user terminal 20 is not configured to confirm, before a target print job is sent from the user terminal 20 to the pull print server 30, whether or not the target print job is a print job the spooling of which is to be inhibited by the pull print server 30.

The pull print system 10 according to the one embodiment of this disclosure displays the setting screen 50 (see FIG. 8B) where the selection of a print setting in which the pull print server 30 inhibits the spooling of a print job is disabled. Therefore, it can be prevented that the user terminal 20 needlessly confirms with the pull print server 30 whether or not a print job the spooling of which is to be inhibited by the pull print server 30 should be spooled.

In the pull print system 10 according to the one embodiment of this disclosure, the MFP 40 can acquire, out of spooled print jobs, print jobs of the user specified by the pull print server 30 and currently operating the user terminal 20.

The pull print system 10 according to the one embodiment of this disclosure sends the plug-in from the pull print server 30 to the user terminal 20 (S131) and installs on the user terminal 20 the plug-in sent from the pull print server 30 to the user terminal 20 (S133). Therefore, a suitable print job can be sent from the user terminal 20 to the pull print server 30 via the plug-in 24b suitable for the pull print server 30.

The pull print system 10 periodically sends a plug-in for updating concurrently to all user terminals managed by the pull print server 30 (S131). However, in the pull print system 10, the plug-in for updating may be sent from the pull print server 30 to the user terminals with other timings. For example, in the pull print system 10, the plug-in for updating may be sent from the pull print server 30 to the user terminals with any timing specified by the administrator. As in the case of setting information, in displaying a setting screen 50 for a job setting on the user terminal 20, the pull print system 10 may cause the user terminal 20 to request the pull print server 30 to send the plug-in for updating.

The pull print system 10 according to the one embodiment of this disclosure causes the user terminal 20 to request the pull print server 30 to send a plug-in in order to display a setting screen 50 for a job setting on the user terminal 20. Therefore, as compared to the configuration in which the plug-in is concurrently sent to all user terminals managed by the pull print server 30, temporal increase in load on the pull print server 30 and the network 11 due to sending of the plug-in from the pull print server 30 to the user terminals can be reduced.

The pull print system 10 according to the one embodiment of this disclosure causes the pull print server 30 to notify the user terminal 20 of setting information for a job setting which is a setting of a print job (S163) and causes the user terminal 20 to display a setting screen for the job setting on which the setting information given from the pull print server 30 to the user terminal 20 is reflected (S166). Therefore, a suitable print job can be sent from the user terminal 20 to the pull print server 30 via the setting screen on which the setting information suitable for the pull print server 30 is reflected. Furthermore, the pull print system 10 according to the one embodiment of this disclosure displays the setting screen where the selection of a print setting in which the pull print server 30 inhibits the spooling of a print job is disabled. Therefore, it can be prevented that a print job having a print setting in which the pull print server 30 inhibits the spooling is needlessly sent from the user terminal 20 to the pull print server 30.

In the description given herein thus far, a print setting of inhibition of multicolor printing is taken as an example of the inhibition print setting. However, the inhibition print setting may comprise a print setting of inhibition of black-and-white printing.

Alternatively, the inhibition print setting may comprise a print setting of inhibition of any printing other than black-and-white printing and multicolor printing. For example, the inhibition print setting may comprise a print setting of inhibition of any of single-sided printing in which only one side of a recording medium is printed, double-sided printing in which both sides of a recording medium are printed, an aggregate printing in which multiple pages are printed on one side of a recording medium, non-aggregate printing in which aggregate printing is not performed, energy-saving printing in which toner consumption is reduced, and non-energy-saving printing in which energy-saving printing is not performed. Furthermore, the inhibition print setting may include the number of remaining copies permitted for the user or the group.

The setting information of which the pull print server 30 notifies the user terminal may include information other than the inhibition print setting.

For example, the setting information of which the pull print server 30 notifies the user terminal may include a queue setting included in the server settings 34c. When the setting information includes a queue setting, a queue newly added to the pull print server 30 by the administrator, a queue the name of which has been changed by the administrator, or the like is reflected on the setting screen for the printer driver 24a. Therefore, the user of the user terminal can select the latest queue on the pull print server 30 as a destination for a print job.

The setting information of which the pull print server 30 notifies the user terminal may include a setting of whether to log in to the pull print server 30 using the authentication information used when the user logged in to the OS (Operating System) or log in to the pull print server 30 using authentication information dedicated for log-in to the pull print server 30.

The setting information of which the pull print server 30 notifies the user terminal may include a setting for access to the pull print server 30, such as an IP (Internet Protocol) address or a port number for the pull print server 30.

The pull print system 10 may periodically send, like a plug-in for updating, a printer driver for updating concurrently to all user terminals managed by the pull print server 30. Furthermore, in the pull print system 10, the printer driver for updating may be sent from the pull print server 30 to the user terminals with any timing specified by the administrator. Moreover, as in the case of setting information, in displaying a setting screen 50 for a job setting on the user terminal 20, the pull print system 10 may cause the user terminal 20 to request the pull print server 30 to send the printer driver for updating.

However, the printer driver typically has a large size as compared to the setting information or the plug-in, which requires a long communication time taken to send it from the pull print server 30 to the user terminal and a long time taken to install it on the user terminal. Therefore, as for the printer driver, in order to reduce the delay of display of the setting screen 50, the pull print system 10 preferably sends the printer driver from the pull print server 30 to the user terminal before the user terminal receives an instruction to display the setting screen 50.

In concurrently sending the printer driver for updating and the plug-in for updating from the pull print server 30 to the user terminal, the pull print system 10 may incorporate the printer driver for updating and the plug-in for updating into the same install package.

In concurrently sending setting information and at least one of the printer driver for updating and the plug-in for updating from the pull print server 30 to the user terminal, the pull print system 10 may incorporate the setting information and the at least one of the printer driver for updating and the plug-in for updating into the same install package.

The pull print system 10 can automatically maintain the printer driver, the plug-in, and the setting information for the user terminal optimized for the pull print server 30 in operation. Therefore, the user can be spared the trouble of manually maintaining the printer driver, the plug-in, and the setting information for the user terminal optimized for the pull print server 30 in operation and the features of the pull print server 30 can be utilized maximally on the user terminal side.

If the printer driver, the plug-in, and the setting information are specified, for example, by version, it can be prevented that unnecessary data is sent from the pull print server 30 to the user terminal.

Although the printing apparatus according to this disclosure is an MFP in this embodiment, it may be any printing apparatus other than the MFP, such as a dedicated printing apparatus.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A pull print system comprising:
a printing apparatus that executes a print job;
a pull print server that spools the print job to be executed as a pull print by the printing apparatus; and
an electronic device that sends the print job to the pull print server,
wherein:
the electronic device comprises a display section and a first storage section, the first storage section storing a printer driver and a plug-in for the printer driver; and
the plug-in is necessary for using an authentication function and an inhibition function of the pull print server,
wherein:
the pull print server comprises a second storage section, the second storage section storing: (i) authentication information on a user, (ii) group information to specify a group to which the user belongs, and (iii) an inhibition print setting in which a spooling of the print job is inhibited by the inhibition function; and
the inhibition print setting is set at least either one of user by user and group by group, and
wherein:
the printer driver notifies the plug-in that an instruction to display a setting screen for a job setting has been input by the user;
the plug-in requests the pull print server to send setting information including the inhibition print setting;
the pull print server sends to the electronic device the setting information including the inhibition print setting;
the setting information is generated based on at least either one of a user under operation and the group including the user under operation specified by the authentication function using at least either one of the authentication information and the group information; and
when displaying a setting screen for a job setting, the display section of the electronic device displays the setting screen on which the inhibition print setting from the pull print server is reflected, and the setting screen displays an indication that inhibits inputting an instruction regarding the print job for which spooling is inhibited by the inhibition print setting by the user.

2. The pull print system according to claim 1,
wherein:
the pull print server (i) generates a install package of a self-extract format including: the printer driver; the plug-in; and an automated installer for use in automatically installing the printer driver and the plug-in, (ii) sends the install package to the electronic device, and (iii) causes the electronic device to execute the install package; and
the electronic device unpacks the install package and executes the automated installer to install the printer driver and the plug-in thereon.

3. The pull print system according to claim 1, wherein the print server of the second storage section further includes a queue setting as a setting of a queue according to which the print job is to be accepted.

4. The pull print system according to claim 1, wherein:
the printer driver notifies the plug-in that an instruction to execute the print job has been input by the user;
the plug-in sends the authentication information on the user and the job setting to the pull print server; and
the pull print server makes, based on the authentication information on the user and the job setting, a determination of whether to spool the print job or not by the authentication function and the inhibition function, and sends a result of the determination to the plug-in.

5. The pull print system according to claim 4, wherein, when the result of the determination indicating that the print job is to be spooled is sent from the pull print server to the plug-in:
the plug-in sends the print job to the pull print server; and
the pull print server spools the sent print job in association with the user.

6. The pull print system according to claim 5, wherein the pull print server:
specifies the user by the authentication function; and
sends to the printing apparatus a list of print jobs of the user among print jobs spooled in the pull print server.

7. The pull print system according to claim 4, wherein, when the result of the determination indicating that the print job is not to be spooled is sent from the pull print server to the plug-in:
the plug-in notifies the printer driver of the result of the determination indicating that the print job is not to be spooled by the pull print server; and
the printer driver causes the electronic device to display the result of the determination indicating that the print job is not to be spooled by the pull print server.

\* \* \* \* \*